Feb. 9, 1965  D. C. BAKER ETAL  3,169,039
TRACK CHAIN
Filed June 24, 1964  2 Sheets-Sheet 1
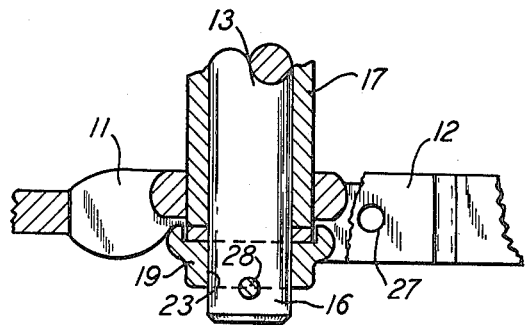
FIG. 3
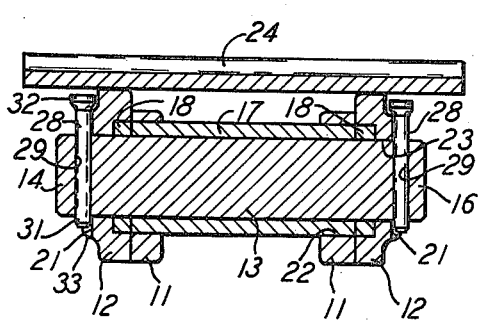
FIG. 2
FIG. 1
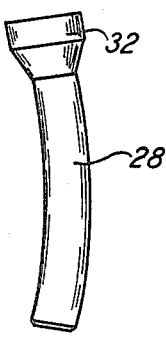
FIG. 4
INVENTORS
DONALD C. BAKER
WILLIAM E. BUDD
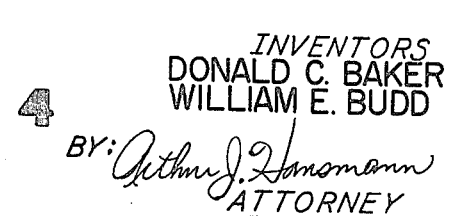
ATTORNEY

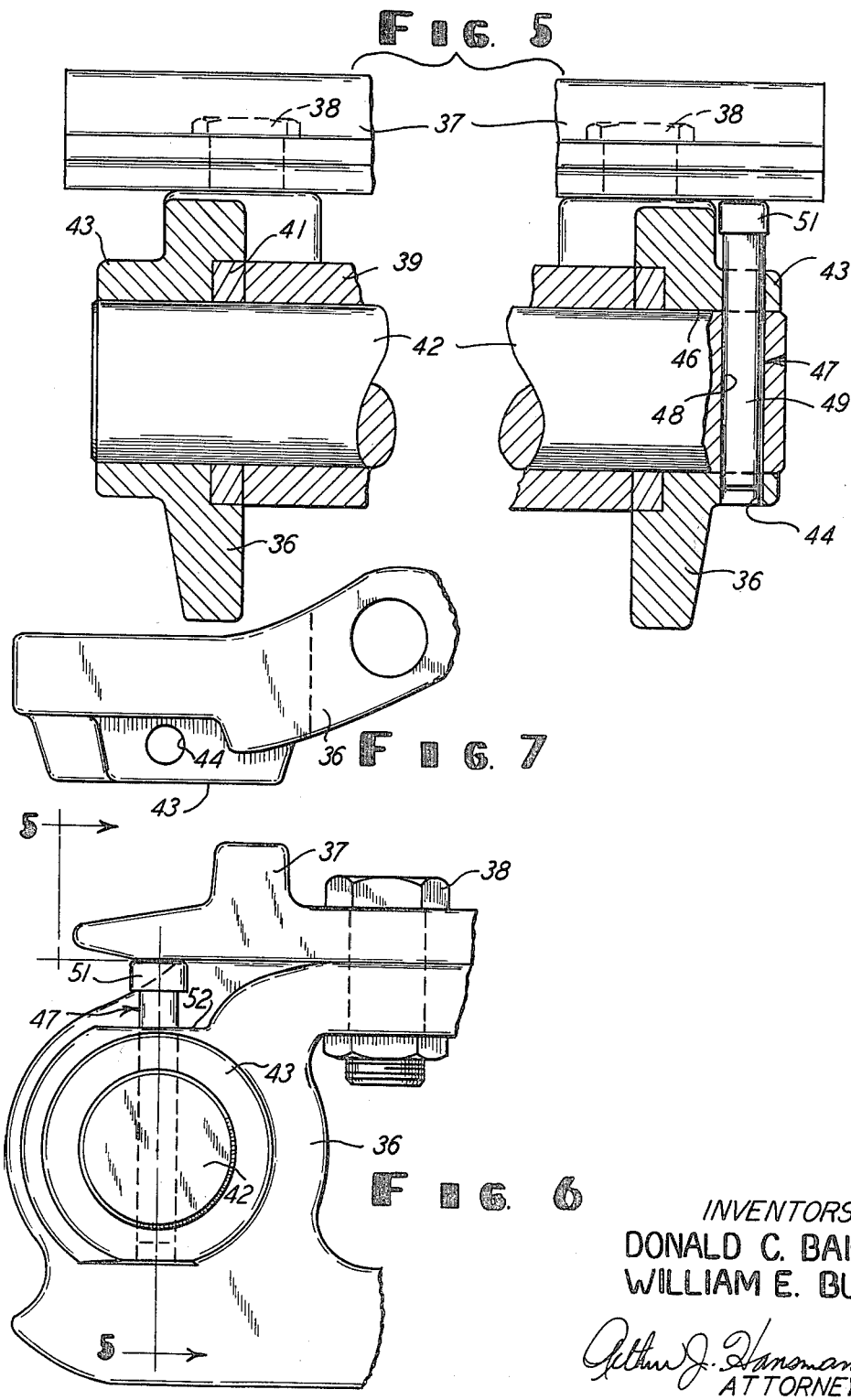

United States Patent Office 3,169,039
Patented Feb. 9, 1965

3,169,039
TRACK CHAIN
Donald C. Baker and William E. Budd, Burlington, Iowa, assignors to J. I. Case Company, Racine, Wis., a corporation of Wisconsin
Filed June 24, 1964, Ser. No. 379,435
5 Claims. (Cl. 305—58)

This invention relates to a track chain, and, more particularly, it relates to a track chain with master links and a master pin and means for securing the master pin in position on the master links. This is a continuation-in-part of U.S. patent application Serial No. 318,642, filed October 24, 1963, now abandoned.

In the assemblage of chains of various types, it is common practice to employ a master pin with the master links of the chain such that, of course, the pin can be removed for disassembly of the chain. In this prior art construction, it has also been the experience that occasionally the master pin inadvertently becomes dislodged from its position on the links, and the chain then separates. Many attempts have been made to secure master pins on chains in efforts to avoid the problem of unintentional separation of the chain. Where the chain is employed in a heavy duty type of work, such as in the track chain employed in the crawler type of tractors, the master pin must be a relatively heavy pin, and the means for securing the pin on the chain must likewise be relatively heavy, and a simple cotter pin or the like is therefore not suitable.

Accordingly, it is an object of this invention to provide a track chain with a master pin securing means which are sufficiently sturdy for heavy duty requirements, and which firmly retain the master pin with respect to the master links, but with the master pin nevertheless being readily removable without damage when it is desired to disconnect the chain. In accomplishing this particular object, it is therefore significant that the securing means for the master pin is adapted to also retain the pin in a firmly fixed and snug assembled position with respect to the master links so that undue wear and damage will not occur to the master pin.

A more specific object of this invention is to provide a master pin with securing means for retaining the pin to the chain in a manner that the pin cannot be removed from the chain without a certain disassembly of the chain for permitting removal of the securing means itself, and in this instance the securing means is a lock pin applied to the master pin.

A further object of this invention is to provide a relatively simple, sturdy, but yet extremely effective lock pin for a chain, wherein the lock pin can be snugly assembled with the chain by actually hammering thereon for the snug fitting mentioned, and wherein the lock pin is positively secured to the chain by the standard elements of the chain itself and thus no additional elements or parts are required for the securing function. Therefore, in accomplishing this particular object, an inexpensive and yet very effective lock pin is provided for a chain.

Still another object is to provide a means for releasably securing a track chain together in an inexpensive, secure, and sturdy manner without requiring a special length master pin and thus the master pin does not interfere with other parts such as a chain guard. Also, only one lock pin is required for each master pin on the chain, in accomplishing these objects.

Further objects and advantages will become apparent upon reading the following description in light of the accompanying drawings, wherein:

FIG. 1 is a side elevational view of a fragment of a chain showing a preferred embodiment of this invention.

FIG. 2 is a sectional view taken on the line 2—2 of FIG. 1.

FIG. 3 is a sectional view taken along the line 3—3 of FIG. 1.

FIG. 4 is an enlarged side elevational view of a special lock pin useful in this invention.

FIG. 5 is a sectional view of a track chain and showing another embodiment of this invention, and with the section taken on the line 5—5 of FIG. 6.

FIG. 6 is a side elevational view of the part of the chain shown in FIG. 5.

FIG. 7 is a top plan view of FIG. 6 with parts removed.

The drawings show the chain generally designated 10 and having a plurality of links, such as master links 11 and 12, pivotally connected together by means of a master pin 13. Of course, the pin 13 extends transverse to the axis of the length of the chain 10 and also transverse to the links 11 and 12. FIGS. 2 and 3 show that the ends 14 and 16 of the master pin 13 extend laterally of the chain and beyond the links. Also, a bushing 17 and spacers 18 extend axially of the pin 13 for spacing the master links 12 as shown.

Further, it will be noted that the master links 12 have bosses 19 projecting laterally of the links, and notch-like openings 21 are provided in the link bosses 19, as shown. Of course it will also be seen that the links 11 and 12 have openings 22 and 23 extending therethrough for receiving the bushing 17 and the master pin 13, respectively.

The chain 10 also has track plates 24 secured to the chain outer surfaces by means of the bolts 26 which extend through bolt holes 27 provided in the chain link.

An important feature of the invention is the provision, location, and orientation of a lock pin 28. Here it will be noted that the pin 28 extends through openings 29 in each of the ends 14 and 16 of the master pin 13. The openings 29 are of course oriented transverse to the links 11 and 12 and the axis of the length of the chain, and further, the openings 29 align with the openings 21 in the master link 12. Thus the pins 28 extend through the openings 21 and 29 in the manner shown, and the lower extended end 31 of each pin 28 is of a particular length hereinafter mentioned. Further, it will be noted that the lock pins 28 have heads 32 which are larger than the size of the openings 21 and 29 so that the lock pins 28 cannot pass downwardly from the position shown as the heads 28 interfere with such downward axial movement of the pins 28. Accordingly, the lock pins 28 are secured against movement in the downward axial direction.

It will also be noted that the track plate 24 is removably attached to the master links 12, and the plate is in the longitudinal extent of the chain and extends across the axis of the lock pins 28. Accordingly, the pins 28 cannot be raised from their shown positions to be removed from the chain while the track plate 24 is in the position shown. Therefore, the pins 28 are completely secured against axial movement in both directions, and will not be accidentally removed from the chain.

The amount of clearance between the pin heads 32 and the track plate 24 is less than the extending ends 31 of the pins 28, and therefore the pin ends 31 can never move upwardly to be clear of the openings 21 in the links 12, and therefore the master pin 13 is securely retained in its oriented position shown. Thus the master links 12 have surfaces or means 33, which are the sides of the links defining the opening 21, and these means 33 retain the master pin 13, and of course the lock pins 28, in the uprightly oriented position shown so that the lock pin 28 will always abut the track plate 24 when the pin moves toward the track plate. So, with the means 33 on the master links 12, the lock pins 28, and of course the holes 29 in the master pin 13, are always oriented transverse to the length of the links 12 and thus transverse to the axis of the length of the chain 10.

Also it will be appreciated that the provision of the heads 32 on the lock pins 28 provides facilities for hammering the pins 28 into the snug fit in the openings 29.

FIG. 4 shows an enlargement of another embodiment of a lock pin 28, and, in this embodiment, is the pin shown to be arcuately shaped or bent such that, when it is assembled with the master pin 13 and the links 12 as described and shown, the pin 28 is in tight fit in the openings described. Thus the pin 28 of course tends to and does straighten in the assembled position, and because of the elasticity of the pin itself, it will remain secure in the assembled position and will not inadvertently move or become removed from the assembled position shown.

The embodiment shown in FIGS. 5, 6, and 7 has even additional advantages in the art of securing a track chain in its operative position. Thus the drawings show the master links 36 which are of course on opposite sides of the chain, and the track plate 37 is attached to the links 36 by means of the bolts such as the shown bolt 38 in FIG. 6. The links 36 therefore cannot move laterally with respect to each other as the track plate 37 retains them in that regard. Also the bushing 39 and washer 41 extend around the master pin 42 and between the master links 36. The bushing 39 of course provides a base for attaching the joining links of the chain, and these links are not shown in this embodiment but would of course be included in the manner that they are included in the other embodiment.

The master links 36 have bosses 43 extending laterally of the longitudinal direction of the chain, and the bosses have circular openings 44 and this opening 44 on each of the links 36 of course intersects the central opening 46 of each of the links 36. Thus a locking pin 47 is slidably received in the opening 44 to extend across the central opening 46, and also the master pin 42 has a central and diametrical opening 48 for the reception of the pin 47. It will therefore of course be understood that the master pin 42 extends through the master link 36 on the right side as viewed in FIG. 5, and the master link and master pin have holes 44 and 48 respectively for reception of the pin 47 as of course the holes 44 and 48 are axially aligned.

The pin 47 has its shank portion designated 49 and it also has its head 51 with the latter disposed between the boss 43 and the track plate 37. It will therefore again be obvious that the enlarged head 51 of the lock pin 47 prevents the pin from moving downwardly in the position shown in FIG. 5 and beyond the openings 44 and 48. The master links 36 and master pin 42 and lock pin 47 would of course all be assembled prior to the bolting of the track plate 37. When the plate 37 is bolted to the chain, then the lock pin 47 will not be able to move upwardly as shown in FIG. 5 and therefore the lock pin is secured in the shown position.

Several important advantages are attained by the embodiment just described. One such advantage is that only one lock pin 47 need be employed, and it will of course be apparent that the lock pin 47 exists on only one side of the chain as shown in FIG. 5 since the left side of the chain does not include a lock pin 47. This is possible since the holes 44 and 48 in the master link 36 and the lock pin 42 are drilled, rather than milled, through the respective members and thus the lock pin 47 will hold the two master parts in the directions along the axis of the master pin 42. In addition to securing in the axial direction, it has of course also been described that the assembly with the lock pin 47 is secured in the direction of the axis of the lock pin 47 and therefore the assembly is entirely secured through the use of only a single lock pin 47 which does not require any clenching, threading for bolting or the like, or any other special provision or treatment, and the pin is therefore retained in the assembled position in an inexpensive, secure, but simplified manner. Also, the master pin 42 need not extend substantially beyond the master links 36 because of the drilled holes going through the members and therefore the lock pin 47 is located within the extent of the links 36, and this arrangement of the shorter master pin 42 therefore assures that the master pin will not strike the rock guards used on track chains of the crawler-type tractors. Thus all of the pins in the chain, which pins are similar to the master pin 42, are all of the same length as the master pin 42 need not be of extra-long length, and also the drilling process through the pin 42 and the link 36 is easier and cheaper than a milling process which might also be employed as previously described. In this embodiment, the pin 47 is preferably straight through its shank portion 49 prior to assembly. Also, FIG. 6 shows there is a space between the pin head 51 and the surface 52 on the master link so that the pin can be readily removed by prying or even tapping when this assembly is desired after the track plate 37 has been removed.

While specific embodiments of this invention have been shown and described, it will be understood that certain modifications can be made therein and the invention should therefore be determined only by the scope of the appended claims.

What is claimed is:

1. A track chain for a tractor or the like, comprising a plurality of links pivotally connected together and including master links, a master pin extending through said master links transverse to the length of said chain, an end of said master pin having a circular hole therethrough axially oriented transverse to both the axis of said master pin and the axis of the length of said chain, one of said master links having a circular opening therein co-axial with said hole, a lock pin having a circular shank disposed in said opening and said hole and being in abutment with said master link at said opening to be retained in the axial orientation of said hole in said master pin with respect to said master links and to axially retain said master pin on said master links in both axial directions of said master pin, a head on one end of said lock pin to restrain the latter from passing through said hole in one direction of the axis of said lock pin, and a member removably attached to said master links and extending across the axis of said lock pin in a position to abut said lock pin upon axial movement of the latter for restraining the latter from moving out of said hole in the other direction of the axis of said lock pin.

2. A track chain for a tractor or the like, comprising a plurality of links pivotally connected together and including master links, a master pin extending through said master links transverse to the length of said links, an end of said master pin having a hole therethrough axially oriented transverse to the axis of said master pin, a lock pin disposed in said hole and extending beyond said master pin for retaining the latter on said master links, one of said master links having an opening co-axial with said hole and receiving the extended end of said lock pin for retaining the orientation of the latter with respect to said master links, a smooth shank on said lock pin for sliding insertion and removal from said master pin at one side of the latter, one end of said lock pin having an enlargement at only said one side of said master pin to restrain said lock pin from passing through said hole to the other side of said master pin, and a member removably attached to said master links and extending across the axis of said lock pin at said one side of said master pin in a position to be closer to one end of said lock pin than the distance the other end of said lock pin extends beyond said master pin for abutting said lock pin upon movement of the latter toward said member and restraining said lock pin from moving out of said hole.

3. A track chain for a tractor, comprising a plurality of links pivotally connected together and including master links, a master pin extending through said master links transverse to the length of said chain, an end of said master pin having a hole therethrough oriented transverse to both the axis of said master pin and the axis of the length of said chain, a lock pin including a straight shank snugly disposed in said hole and extending therebeyond and adapted to be slidable in and out of said hole and said lock pin including an enlarged head on one end for restraining said lock pin from passing through said hole in one axial direction, means on one of said master links and engageable with the extended end of said lock pin for retaining the orientation of the latter with respect to said master links, and a track plate removably attached to said master links and extending across the axis of said lock pin adjacent said head in a position sufficiently close thereto to restrain said lock pin from moving out of said hole in the other axial direction.

4. A track chain for a tractor, comprising a plurality of links pivotally connected together and including master links with bosses thereon, a master pin extending through said master links transverse to the length of said chain and extending through said bosses, only one end of said master pin and the one of said bosses surrounding same having co-axial holes therethrough oriented transverse to both the axis of said master pin and the axis of the length of said chain, a lock pin disposed in said holes and extending beyond said master pin for retaining said master pin to said master links in both axial directions of said master pin, a head on one end of said lock pin to restrain the latter from passing through said holes in one direction of the axis of said lock pin, and a member removably attached to each of said master links and joining the latter together and extending across the axis of said lock pin adjacent said head and being sufficiently close thereto to restrain said lock pin from moving out of said hole in the other direction of the axis of said lock pin.

5. A track chain for a tractor, comprising a plurality of links pivotally connected together and including master links, a master pin extending through said master links transverse to the length of said chain, only one end of said master pin having a hole therethrough oriented transverse to both the axis of said master pin and the axis of the length of said chain, one of said master links having a hole co-axial with said hole of said master pin to provide two co-axial holes, a lock pin disposed in said co-axial holes and extending beyond said master pin in both ends of said lock pin for retaining said master pin to said master links in both axial directions of said master pin, a head on one end of said lock pin to restrain the latter from passing through said co-axial holes in one direction of the axis of said lock pin, and a track plate removably attached to said master links and joining the latter together and extending across the axis of said lock pin to the end thereof adjacent said head and being spaced therefrom a distance less than the length of the other end of said lock pin extending beyond said master pin for abutting said lock pin upon axial movement of the latter to restrain the latter from moving out of said co-axial holes in the other direction of the axis of said lock pin.

References Cited by the Examiner
UNITED STATES PATENTS

| | | | |
|---|---|---|---|
| 1,111,583 | 9/14 | Holt | 305—11 |
| 1,507,757 | 9/24 | Savage | 305—58 X |
| 1,573,579 | 2/26 | Ross | 16—169 |
| 3,032,376 | 5/62 | Blazek et al. | 305—58 |
| 3,101,221 | 8/63 | Waddell | 305—59 X |

ARTHUR L. LA POINT, *Primary Examiner.*